United States Patent
You et al.

(10) Patent No.: US 7,495,717 B2
(45) Date of Patent: Feb. 24, 2009

(54) LIQUID CRYSTAL DISPLAY MODULE HAVING A LIGHT SHEET WITH HARDENED PART

(75) Inventors: Dong Jae You, Kumi-shi (KR); Woo Jae Lee, Kyoungsangbuk-do (KR); Moon Soo Yeom, Ulsan-shi (KR); Byung In Park, Kyunggi-do (KR)

(73) Assignee: LG. Display Co., Ltd., Seoul (KR)

( * ) Notice: Subject to any disclaimer, the term of this patent is extended or adjusted under 35 U.S.C. 154(b) by 125 days.

(21) Appl. No.: 10/701,822

(22) Filed: Feb. 26, 2004

(65) Prior Publication Data

US 2004/0169785 A1  Sep. 2, 2004

(30) Foreign Application Priority Data

Feb. 28, 2003 (KR) ...................... 10-2003-0012639
May 16, 2003 (KR) ...................... 10-2003-0031189

(51) Int. Cl.
*G02F 1/1335* (2006.01)
(52) U.S. Cl. ............................ 349/64; 349/62; 362/606
(58) Field of Classification Search ................... 349/64, 349/71, 161, 62; 362/606, 607, 618, 627
See application file for complete search history.

(56) References Cited

U.S. PATENT DOCUMENTS

| | | | |
|---|---|---|---|
| 5,886,759 A * | 3/1999 | Mashino et al. | 349/65 |
| 6,595,651 B2 * | 7/2003 | Jeong et al. | 362/600 |
| 6,891,580 B2 * | 5/2005 | Jang et al. | 349/58 |
| 2001/0006461 A1 * | 7/2001 | Okuno | 362/311 |

* cited by examiner

*Primary Examiner*—Andrew Schechter
(74) *Attorney, Agent, or Firm*—Brinks Hofer Gilson & Lione

(57) ABSTRACT

A liquid crystal display contains a light source, a light guide panel that directs light from the light source towards a display panel, and optical sheets containing a diffusion sheet that spreads the light from the light guide panel and at least one prism sheet that redirects light from the diffusion sheet in a direction substantially perpendicular to the display panel. The optical sheets contain a region adjacent to the light source that has a hardened part that substantially prevents heat from being transferred to a display region of the optical sheet corresponding to the display region of the display panel and minimizes the temperature difference across the display region. The hardened part is formed on at least opposing sides of the optical sheets, overlaps a non-display region of the display panel and is bent or contains a convex part that projects towards the display panel.

24 Claims, 23 Drawing Sheets

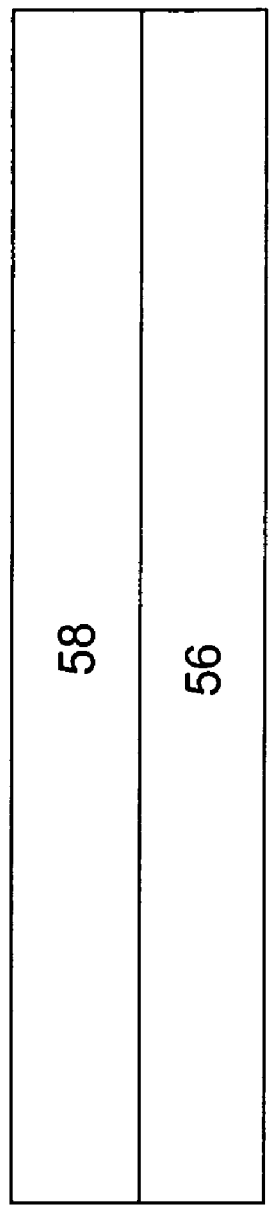

LIQUID CRYSTAL DISPLAY MODULE HAVING A LIGHT SHEET WITH HARDENED PART

BACKGROUND

1. Field of the Invention

This application claims the benefit of Korean Patent Application No. 2003-12639, filed on Feb. 28, 2003, and Korean Patent Application No. 2003-31189, filed on May 16, 2003, each of which are incorporated herein by reference.

2. Description of the Related Art

In general, a liquid crystal display (hereinafter referred to as "LCD") displays desired pictures by controlling the amount of transmission of light supplied from a backlight unit to a liquid crystal panel. The liquid crystal panel comprises a plurality of liquid crystal cells arranged in a matrix form and a plurality of control switches for switching a video signal supplied to each of the liquid crystal cells.

FIG. 1 is a perspective view illustrating a liquid crystal display of the related art.

Referring to FIG. 1, the liquid crystal display of the related art has a backlight unit containing a light source 22, a light source housing 4, a light guide panel 2, a plurality of optical sheets 8, 10 and 12, and a reflection plate 6. The light source 22 generates light. The light source 22 is installed in a light source housing 4. The light guide panel 2 converts the light incident from the light source 22 into a planar light source. The plurality of optical sheets 8, 10 and 12 are attached on the light guide panel 2 for improving the light efficiency incident on a display panel. The reflection plate 6 is attached to the rear surface of the light guide panel 2 for reflecting the light emitted towards a rear surface of the light guide 2 back towards the liquid crystal panel 20. The liquid crystal panel 20 provides images using the light from the light source 22.

In the related art, the light source 22 is typically a cold cathode fluorescent light source, and the light generated from the light source 22 is incident to the light guide panel 2 through the incident surface formed in a side of the light guide panel 2.

The light source housing 4 is installed to enclose the light source 22 and has a reflection plate in its inside to reflect the light from the light source 22 to the incident surface of the light guide panel 2.

The light guide panel 2 converts the light incident from the light source 22 into the planar light source. The light guide panel 2 has a slanted rear surface and a flat front surface, which is perpendicular with respect to the incident surface of the light guide 2. Installed in the rear surface of the light guide panel 2 is a reflection plate 6 facing thereto. The light guide panel 2 takes the light incident from the light source 22 and directs it to a point that is distant from the light source 22. The light guide panel 2 generally has a high strength and thus is not easily deformed or fractured. Conventional light guide panels are formed with a polymethylmethacrylate PMMA having a high transmittance.

Light that is incident on the reflection plate 6 from the rear surface of the light guide panel 2 is reflected back to the light guide panel 2, thereby increasing the amount of light directed towards the liquid crystal and reducing the light loss. If the light from the light source 22 is incident to the light guide panel 2, the light is reflected by a predetermined slanting angle in the slanted lower surface such that it is uniformly directed to the exit surface. The light proceeding to the rear surface and the side of the light guide panel 2 is reflected on the reflection plate 6 to proceed to the front surface. A diffusion sheet 8 spreads the light that exits via the front surface of the light guide panel 2 over the entire surface of the diffusion sheet 8.

The light efficiency increases when light incident to the liquid crystal panel 20 is perpendicularly incident to the liquid crystal panel 20. To this end, two prism sheets 10 and 12 are stacked on the diffusion sheet 8 so that the angle of the light that exits from the light guide panel 2 becomes perpendicular to the liquid crystal panel 20. The first and the second prism sheets 10 and 12 contain a plurality of prism bars each having a ridge and a groove. The prism sheets 10 and 12 serve to collect the light that has exited from the diffusion sheet 8 and provide it to the screen in a direction perpendicular to the screen.

A protection film (not shown) may be formed on the second prism sheet 12. The protection film protects the surface of the second prism sheet 12 helps to distribute the light uniformly.

The light generated from the backlight unit is incident on the liquid crystal panel 20.

The liquid crystal panel 20 includes liquid crystal cells (not shown) which are disposed in an active matrix type between an upper array substrate 20a and a lower array substrate 20b. Each of the liquid crystal cells includes a thin film transistor for switching a video signal installed therein. A refraction ratio of each of the liquid crystal cells is changed in accordance with the video signal, whereby the pictures corresponding to the video signal are displayed. That is, the liquid crystal is driven by a voltage difference of the pixel electrode included in the lower array substrate 20b and a common electrode included in the upper array substrate 20a to selectively transmit the light from the backlight unit and thereby display the pictures.

When power is supplied to the liquid crystal display of the related art after the liquid crystal display has been inactive for a long time, warping occurs in the region(s) of at least one of the optical sheets 8, 10, 12 (herein referred to as the optical sheet 16) most proximate to the light source 22. As shown in FIG. 2, the reason is that warping occurs in the various sheets, as typified by the optical sheet 16 illustrated in the figure, due to the large amount of heat generated by the light source 22. More specifically, in the optical sheet 16, a relatively large temperature difference arises between a region adjacent to the light source 22 and the display region of the optical sheets 16 as well as a region of the optical sheet 16 relatively distant from the light source 22. This, in turn, causes non-uniform expansion of the optical sheet 16, which induces the warping in the optical sheet 16, especially the side of the optical sheet 16 most proximate to the light source 22 and contributes to non-uniformity of display.

SUMMARY OF THE INVENTION

Accordingly, one advantage of the present invention prevention of deformation of the various optical sheets caused by a heat emitted from a light source prevented.

In one embodiment of the present invention, a display comprises a light source, a display panel that provides images in a display region to an observer using light from the light source, and at least one optical sheet through which light from the light source passes and having a region most proximate to the light source with a hardened part that substantially prevents heat from the light source from being transferred to a display region of the at least one optical sheet corresponding to the display region of the display panel. In another embodiment, the display may comprise a plurality of optical sheets.

The display may further comprise a light guide panel on which light from the light source impinges and from which light is emitted towards a display panel and the at least one optical sheet comprise a diffusion sheet.

The at least one optical sheet may comprise a non-display region in which the hardened part is formed.

The display panel may comprise a non-display region in which images are not displayed, and the hardened part overlaps the non-display region of the display panel. In this case, the hardened part may overlap only the non-display region of the display panel.

The hardened part may be formed on at least opposing sides of the at least one optical sheets.

The hardened part may comprise a section bent by a predetermined angle. In this case, the section may be bent towards the display panel, the predetermined angle may be about 20° to about 90°, and/or a length of the hardened part may be about 0.5 mm to about 0.2 mm.

The hardened part may comprise a projecting part. In this case, the projecting part may project towards the display panel, and/or a height of the projecting part may be about 0.15 mm to about 0.2 mm.

The hardened part may comprise a bent part that is bent by a predetermined angle and a convex part. In this case, the convex part may be disposed within the bent part, the bent part may be bent towards the display panel, and/or the convex part may project towards the display panel.

The hardened part may be separated into hardened patterns. In this case, the hardened patterns may be substantially rectangular, the display panel may have a non-display region in which images are not displayed and the hardened patterns overlap the non-display region of the display panel, and/or the hardened patterns overlap only the non-display region of the display panel.

A temperature difference across the display region of the at least one optical sheets may be minimized and/or the hardened part aligned in a direction of warping generated by the heat from the light source.

In another embodiment, a method of manufacturing a display comprises obtaining a light source, obtaining a display panel in which images are observed by an observer in a display region using the light, obtaining at least one optical sheet through which light from the light source passes having a hardened part that substantially prevents heat from the light source from being transferred to a display region of the at least one optical sheet corresponding to the display region of the display panel, and positioning the at least one optical sheet such that at least a portion of the hardened part is more proximate to the light source than the center of the at least one optical sheet.

The method may further comprise forming the hardened part in the at least one optical sheet.

The method may further comprise converting the light from the light source into a substantially planar light source and directing the converted light towards the display panel, and diffusing the converted light uniformly over a diffusion region and directing the uniformly spread light towards the display panel in a direction substantially perpendicular to the display panel.

The method may further comprise positioning the hardened part in a non-display region of the at least one optical sheet that overlaps with a non-display region of the display panel in which images are not provided to the observer. In this case, the method may further comprise positioning the hardened part such that the hardened part only overlaps the non-display region of the display panel.

The method may further comprise positioning the at least one optical sheet such that the hardened part is disposed on at least opposing sides of the at least one optical sheet.

The at least one optical sheet may contain the hardened part having a bent section bent toward the display panel by a predetermined angle. In this case, the method may further comprise forming the bent section in the at least one optical sheet.

The at least one optical sheet may contain the hardened part having a projecting portion that projects towards the display panel. In this case, the method may further comprise forming the projecting portion in the at least one optical sheet and/or the projecting portion comprise a convex part.

The hardened part may contain a bent part that is bent by a predetermined angle and a projecting portion. In this case, the projecting portion may project towards the display panel, the projecting portion may be disposed within the bent part, the projecting portion may comprise a convex part, and/or the hardened bent part may be bent towards the display panel.

The hardened part may comprise hardened patterns.

The method may further comprise cutting a portion of the at least one optical sheet along a line that includes the hardened part. In this case, the method may further comprise cutting the hardened part substantially perpendicular to the hardened part to form the hardened patterns.

The method may further comprise separating the hardened part into hardened patterns.

The method may further comprise positioning the hardened part in a region of the at least one optical sheet that overlaps with a non-display region of the display panel in which images are not provided to the observer. In this case, the method may further comprise positioning the hardened part only in the non-display region of the display panel and/or comprise cutting the at least one optical sheet only in the non-display region of the display panel.

The method may further comprise minimizing a temperature difference across the display region of the at least one optical sheet and/or aligning the hardened part in a direction of warping generated by the heat from the light source.

BRIEF DESCRIPTION OF THE DRAWINGS

These and other advantages of the invention will be apparent from the following detailed description of the embodiments of the present invention with reference to the accompanying drawings, in which:

FIG. 14 is a cross sectional view illustrating one of the optical sheets.

DETAILED DESCRIPTION OF THE INVENTION

Reference will now be made in detail to the embodiments of the present invention, examples of which are illustrated in the accompanying drawings. Hereinafter, as referring to FIGS. 3 to 13, embodiments of the present invention will be explained in full detail.

Figure 1:
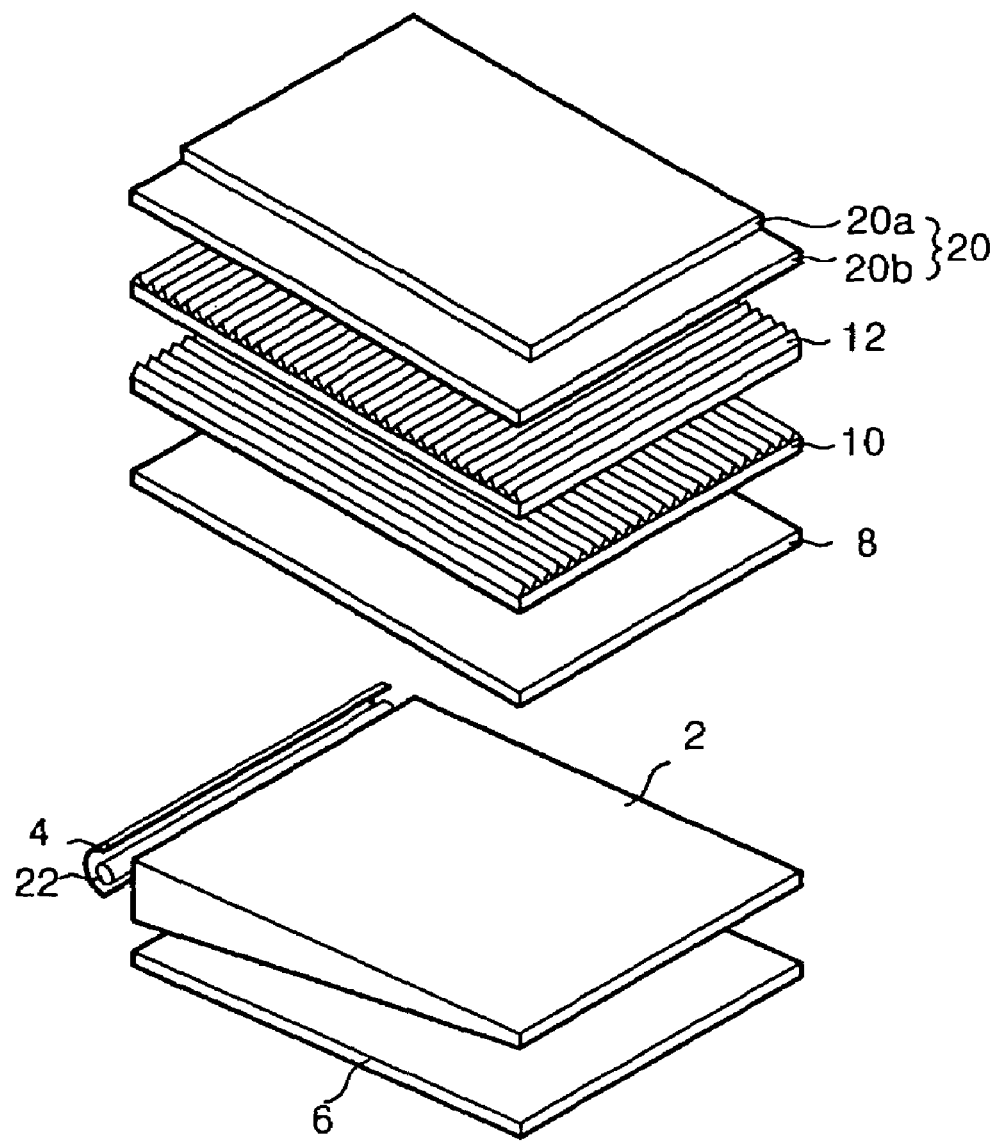
FIG. 1 is a perspective view illustrating a liquid crystal display of the related art.
Figure 2:
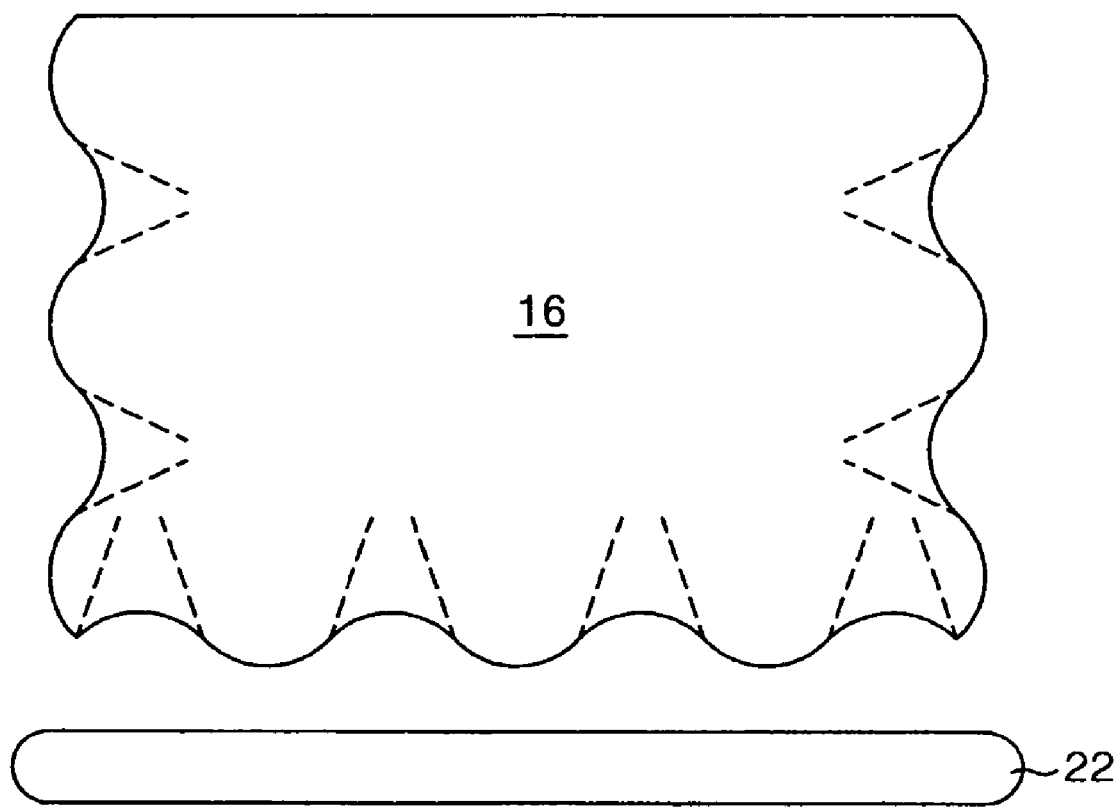
FIG. 2 illustrates a liquid crystal display having a deformation caused by a light source shown in FIG. 1.
Figure 3:
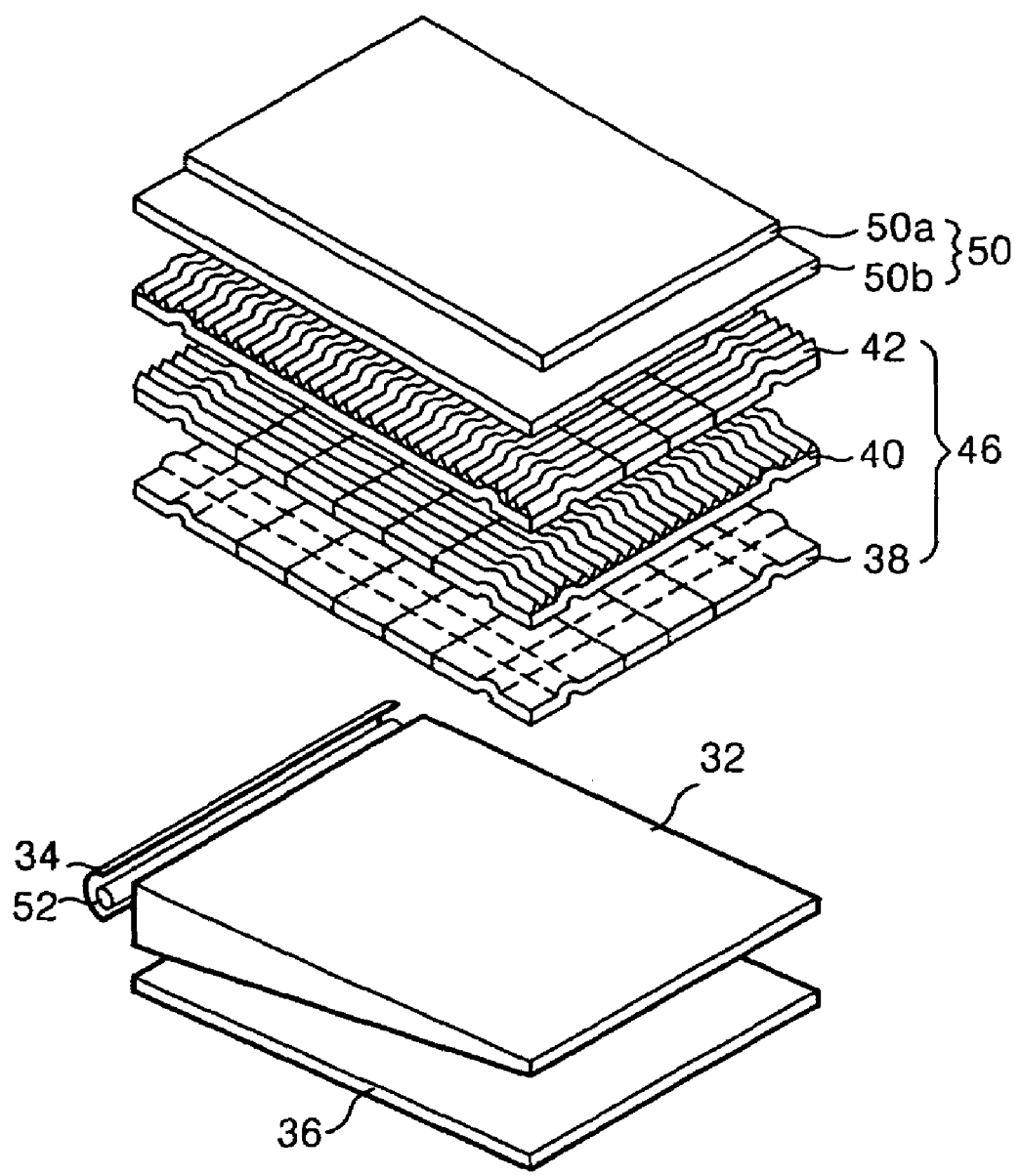
FIG. 3 is a perspective view illustrating a liquid crystal display according to a first embodiment of the present invention.

FIG. 3 is a cross sectional view illustrating a liquid crystal display according to a first embodiment of the present invention.

Referring to FIG. 3, the liquid crystal display according to the first embodiment of the present invention comprises a light source 52 that generates light. The light source 52 is installed in a light source housing 34. A light guide panel 32 converts the light incident from the light source 52 into a light source that is planar with the liquid crystal display panel 50 (also referred to merely as display panel). A plurality of optical sheets 38, 40, and 42 are attached on the light guide panel 32. The optical sheets 38, 40, and 42 have a convex part that improves the stress on the optical sheets 38, 40, and 42 generated by heat that is in turn produced by the light source 52. A reflection plate 36 is attached to the rear surface of the light guide panel 32 (the surface most distal to the display panel 50). The reflection plate 36 reflects the light emitted from the rear surface of the light guide panel 32 back towards the display panel 50. The display panel 50 provides images to an observer using the light from the light source 52, primarily when the device is in conditions in which external light is insufficient to illuminate the display. In addition, displays other than liquid crystal displays may be used, such as displays containing plasma displays, field emission displays, vacuum fluorescent displays or other elements.

The light source 52 may be, for example, a cold cathode fluorescent light source. The light generated from the light source 52 is incident to the light guide panel 32 through the incident surface formed in a side of the light guide panel 32. The light source 52 and the light source housing 34 may be shaped to provide an efficient, lightweight, and inexpensive source of light to the light guide panel 32. Although only one light source is shown, light sources may be disposed more proximate to one or more of the other edges of the optical sheets. In such an embodiment, the hardened portion described herein may be formed in each of the sides or ends of the optical sheet most proximate to the light sources. In the embodiment shown, the light source 52 may be substantially cylindrical to take advantage of the light source housing 34. In all uses herein, the term substantially includes both the exact, for example, shape or dimension described as well as shapes or dimensions near that described which do not detrimentally affect the element appreciably.

The light source housing 34 encloses the light source 52. The light source housing 34 may either be fabricated from a material that reflects light from the light source 52, such as a polished metal, or may have a separate reflection plate disposed on the inside of the light source housing 34. The light source housing 34 reflects the light from the light source 52 towards the incident surface of the light guide panel 32.

The light guide panel 32 converts the light incident from the light source 52 into a substantially planar light source, as above. The light guide panel 32 has a slanted rear surface and a substantially planar front surface (the surface most proximate to the display panel 50). This is to say that the particular surface of the light guide panel 32 is slanted or substantially planar with respect to a surface of the display panel 50 most proximate to a user of the display. The front surface of the light guide panel 32 is substantially perpendicular to the incident surface of the light guide 2. A reflection plate 36 is disposed such that it faces the rear surface of the light guide panel 52 but maybe substantially planar with the front surface of the light guide panel 52. The light guide panel 32 thus takes the light incident from the light source 52, which is localized at the incident surface of the light guide panel 32, and extends it to a distant point from the light source 52. The light guide panel 32 generally has a high strength and thus is not easily deformed or fractured. The light guide panel 32 may be formed from polymethylmethacrylate PMMA, which has a high transmittance of light emitted by the light source 52 while still having high structural strength.

The reflection plate 36 reflects the incident light from the light guide panel 32 back towards the rear surface of the light guide panel 32. This increases the amount of light that is incident on the display panel 50 and reduces the amount of light lost through the rear surface. The rear surface is slanted so that the majority of the light from the light source 52 is uniformly reflected towards the front surface. The remainder of the light that passes through the rear surface of the light guide panel 32 is reflected by the reflection plate 36 in the manner above.

The diffusion sheet 38 spreads light exiting the front surface of the light guide panel 32 along a desired region. This region may be the display region of the display panel 50.

The first and the second prism sheets 40 and 42 comprise a plurality of prism bars having a ridge and a groove. The first and the second prism sheets 40 and 42 collect light exiting from the diffusion sheet 38 and adjust the direction of the light such that the light exits from the first and the second prism sheets 40 and 42 in a substantially perpendicular direction to the surface of the display panel 50. This improves the efficiency of the light impinging on the display panel 50 and eventually viewed by the user.

A protection film (not shown) may also be disposed between the second prism sheet 42 and the display panel 50. The protection film aids in diffusion the light from the second prism sheet 42 uniformly while protecting the surface of the second prism sheet 42.

The light generated from the backlight unit is incident on the display panel 50. The display panel 50 includes liquid crystal cells which are disposed in an active matrix type between an upper array substrate 50a and a lower array substrate 50b. Each of the liquid crystal cells includes a thin film transistor that is switched depending on an applied video signal. The refraction ratio of each of the liquid crystal cells is changed in accordance with the video signal whereby the pictures corresponding to the video signal are displayed. That is, the liquid crystal is driven by a voltage difference of the pixel electrode included in the lower array substrate 50b and a common electrode included in the upper array substrate 50a to selectively transmit the light from the backlight unit, to thereby display the pictures. The liquid crystal panel 50 is divided in to a display region in which the pictures are displayed and a non-display region. The liquid crystal cell is located in the display region while a pad having the wiring and/or electronics that supply the driving signal for driving the liquid crystal cell is located in the non-display region.

A convex part 62 is formed in at least one side of at least one of the diffusion sheet 38 and the first and the second prism sheets 40 and 42, which will also be referred to as the optical sheet 46. As FIG. 3 illustrates, the convex part 62 is formed proximate to opposite ends of the optical sheet 46. The convex part 62 may not be disposed in identical positions in each sheet in which it is present. More particularly, the convex part 46 formed in the diffusion sheet 38 may be proximate to each side of the diffusion sheet 38, thereby having a rectangular shape. This contrasts with the convex part 62 formed in the first prism sheet 40, which may be proximate to only opposing ends, and the convex part 62 formed in the second prism sheet 40, which may also be formed proximate to opposing ends but substantially perpendicular to the convex part 62 formed in the first prism sheet 40 (these directions are also referred to as running substantially parallel with or substantially perpendicular to the light source 52). The formation of the hardened part in opposing sides or ends rather than only one end may maintain the uniformity of the display and may be easier to fabricate. In addition, if multiple light sources exist in different locations, the hardened part may be formed proximate to each light source.

Figure 4:
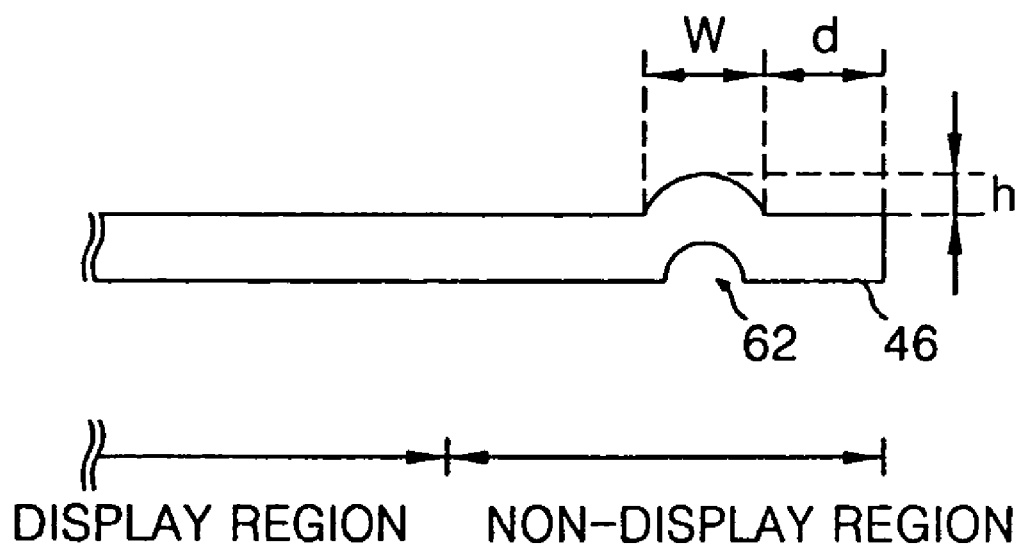
FIG. 4 illustrates a convex part of an optical sheet shown in FIG. 3.

As shown in FIGS. 3 and 4, the convex part 46 is formed in a non-display region of the optical sheet 46. The non-display region of the optical sheet 46 overlaps the non-display region of the display panel 50. The convex part 62 projects towards the display panel 50 from the plane on which the majority of the optical sheet 46 is formed and which is substantially parallel with the plane of the front surface of the display panel 50. The convex part 62 formed in the non-display region of the optical sheet 46 has, for example, a width of about 1 mm and a height of about 0.15 mm to about 0.2 mm and the distance d between the end of each of the optical sheets and a starting point of the convex part 62 is about 1 mm. A width in the range of about 0.5 mm to about 2 mm, height in the range of about 0.1 mm to about 0.3 mm, and distance of about 0.5 mm to about 2 mm all permit the convex part 62 to be large enough to be formed easily while still being small enough to not substantially increase the size of the device, as well as being substantial enough to increase the temperature resistance of the optical sheet 46.

Figure 12:
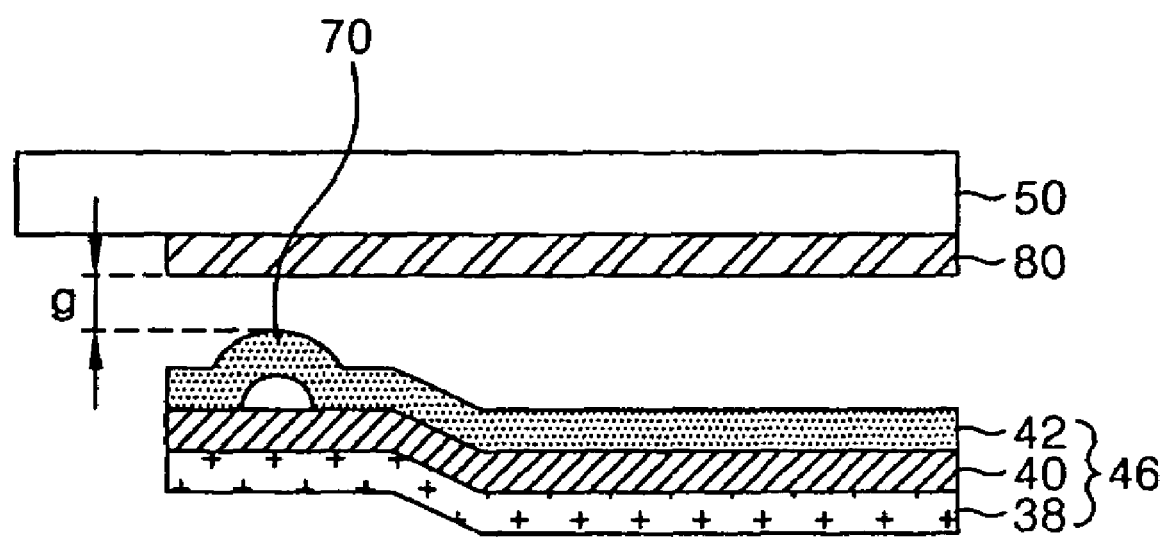
FIG. 12 is a cross sectional view illustrating a hardened part and a lower polarization plate having a predetermined gap.

The convex part 62 is formed in the optical sheet 46 during cutting or other processing of the optical sheet 46. As previously described, although in FIG. 3 the convex part 62 is formed in each optical sheet 46, the convex part 62 may be formed in fewer than each optical sheet 46, as shown in FIG. 12 for example. Stress generated within the optical sheet 46 due to the processing used to form the convex part 62 causes at least a portion of the optical sheet 46 proximate to the convex part 62 to be hardened. The hardened portion of the optical sheet 46 is more resistive to physical changes caused by a variation in temperature compared with the related art as breakdown stress is increased. Temperature and display through the display portion of the optical sheet 46 is more uniform.

The hardened part thus may be formed (in this embodiment, the convex part 62) near the end of the optical sheet 46 most proximate to the light source 52 either along the entirety of the end or along the area substantially affected by the heat generated by the light source 52. In the latter case, if the light source 52 has a relatively small length compared with the optical sheet 46, it may not be necessary to form the convex part 62 over the entire length of the optical sheet 46. On the other hand, it may be easier to fabricate the convex part 62 over the entire length of the optical sheet 46 and/or the resistance to warping may be more uniform if the convex part 62 is formed over the entire length of the optical sheet 46. In any case, the warping phenomenon in the optical sheet 46 induced by the heat generated by the light source 52 may be decreased or prevented by formation of the hardened part. In addition, as one of the factors that affect the picture quality is variation of the distance between the optical sheet 46 and the display panel 50 in the display region of the display panel 50, the convex part 62 of the optical sheet 46 does not affect the picture quality of the display since it overlaps only the non-display region of the display panel 50. Fabrication may be achieved using conventional cutting tools or using a metallic pattern having line-type protrusions.

Figure 5:
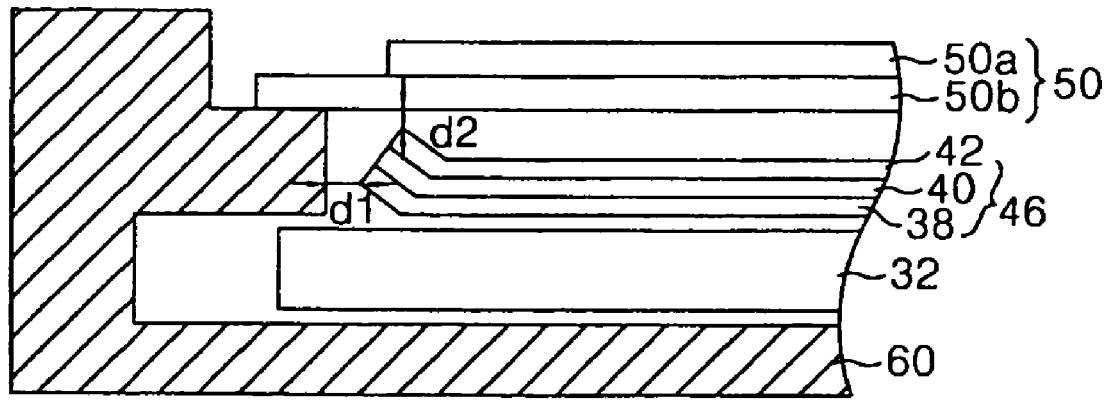
FIG. 5 is a cross sectional view illustrating a liquid crystal display according to a second embodiment of the present invention.

FIG. 5 is a cross sectional view illustrating the liquid crystal display according to a second embodiment of the present invention.

Referring to FIG. 5, the liquid crystal display according to the second embodiment of the present invention comprises the same components as the liquid crystal display shown in FIG. 3 except that the convex part is replaced by a bent part.

As shown in FIG. 5, the light guide panel 32, optical sheet 46, and display panel 50 are encased in a housing 60 of the device. The light source 52 and light source housing 34 are also enclosed by the housing 60, but are not shown for clarity. Although not shown, the housing 60 may house the same elements as those in the other embodiments. As illustrated, in this embodiment the hardened part comprises a bent part 48, which is formed at the edge of the optical sheet 46. As above, the bent part may be formed in each optical sheet 46 or less than each optical sheet. The bent part 48 is formed so that one side of the optical sheet 46 is bent towards the display panel 50 by a predetermined slanting angle θ. The slanting angle θ is measured from surface of the optical sheet 46, which is substantially parallel to the surface of the display panel 50 most proximate to the optical sheets 50. By bending the bent part 46 towards the display panel, space may be saved and the uniformity of light from the light guide panel 32 may be increased.

Figure 6:
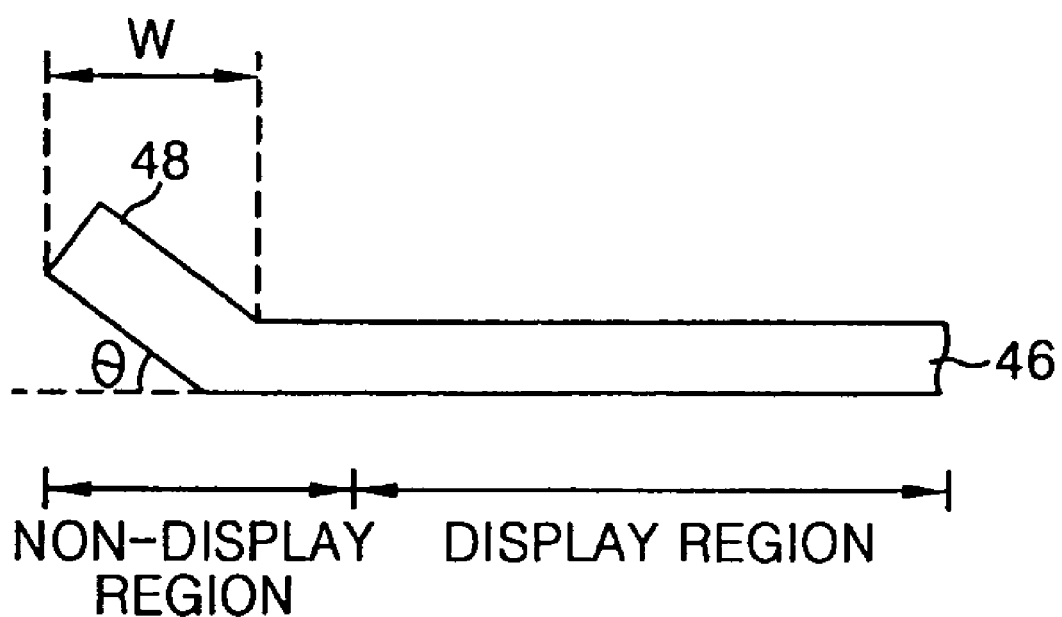
FIG. 6 illustrates a bent part of an optical sheet shown in FIG. 5.

The portion of the bent part 48 most proximate to the support main of the housing is located at a first distance d1 and is located at a second distance d2 from the lower substrate 50b of the display panel 50. As shown in FIG. 6, the bent part 48 is formed in a non-display region of the optical sheet 46, which over laps the non-display region of the display panel 50. The bent part 48 has, for example, a width of about 0.5 mm to about 2 mm, a slanting angle θ of about 20 to about 90°, with the first distance d1 being about 0.15 mm to about 0.25 mm and the second distance d2 being about 0.3 mm to about 0.5 mm. The dimensions and angular range may be used for the same reasons as the dimensions of the convex part.

Similar to the previous embodiment, the end of the bent part 48 is bent at the predetermined angle during cutting (or other processing) of the optical sheet 46. Stress generated within the optical sheet 46 due to the processing used to form the bent part 48 causes at least a part of the optical sheet 46 to be hardened as pressure is applied. The extent of the hardening is apparent to the naked eye when viewing the optical sheet 46. The hardened part of the optical sheet 46, as well as the optical sheet 46, is more resistive to physical changes caused by a variation in temperature as in the previous embodiment. The bent part 48 however, increases the resistance of the optical sheet 46 to a temperature change relatively more than the convex part 62. As in the previous embodiment, the bent part 48 may be formed either proximate to the end along the entirety of each optical sheet 46 or along the area substantially affected by the heat generated by the light source 52 for the same reasons. As above, warping in the optical sheet 46 induced by the heat generated by the light source 52 is decreased or prevented and the picture quality remains at least substantially unaffected as the bent part 48 of the optical sheet 46 may overlap only the non-display region of the display panel 50. Fabrication of the bent part 48 illustrated in FIG. 5 may be easier than fabrication of the convex part 62 illustrated in FIG. 3. Fabrication may be achieved using conventional cutting tools, with the sharpness and speed of the tool determined as appropriate.

Figure 7A:
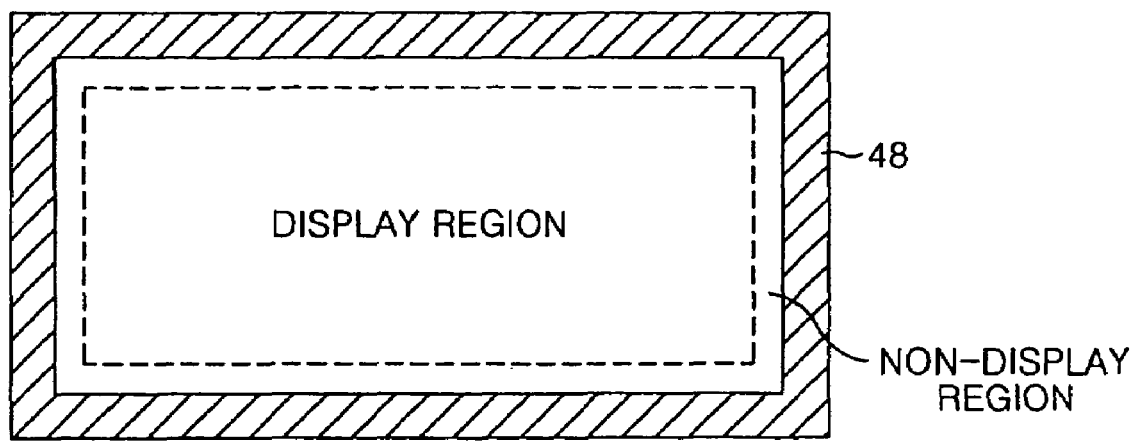
FIGS. 7a, 7b and 7c are planar views illustrating various locations of the bent part shown in FIG. 5.
Figure 7B:
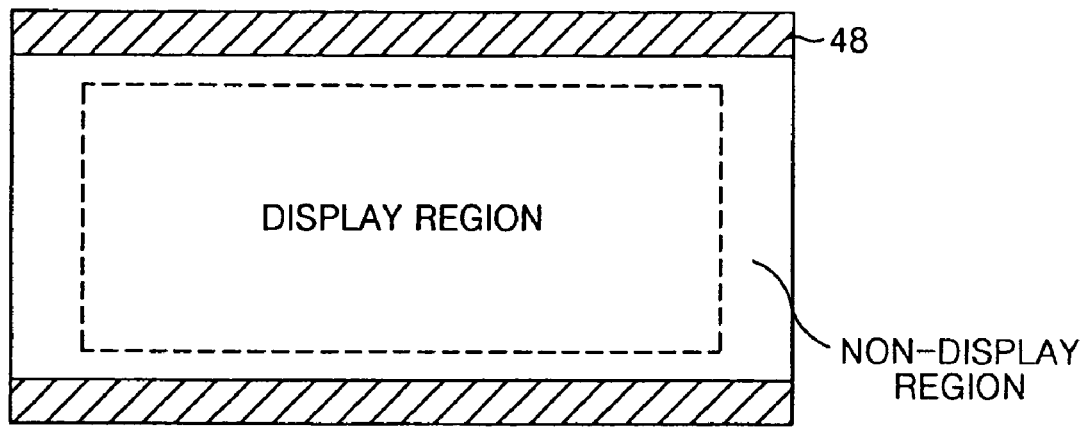
Figure 7C:
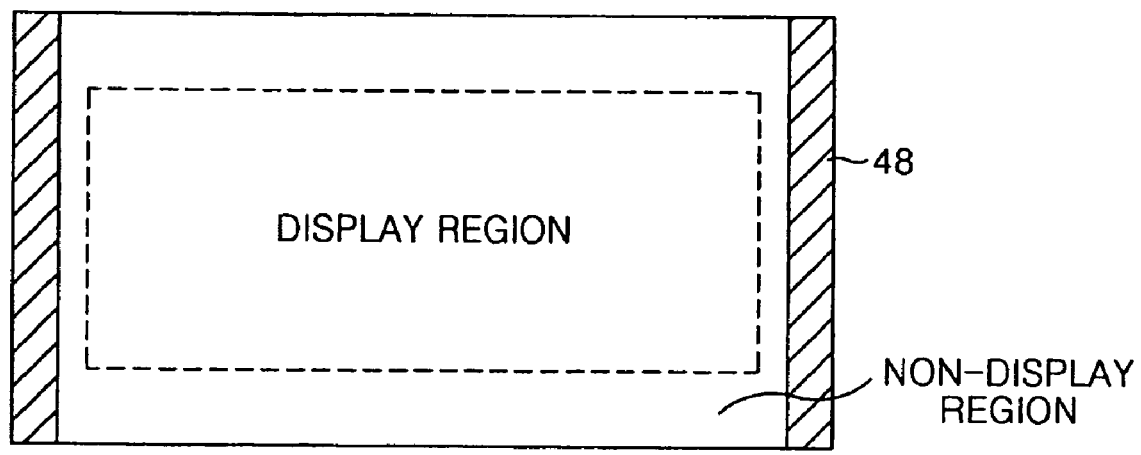

As shown in FIG. 7a, the bent part 48 may be formed by bending all four sides of the optical sheet 46. Alternately, as shown in FIG. 7b, the bent part 48 may be formed by bending opposing sides of the optical sheet 46 that are substantially parallel with the light source 52, or as shown in FIG. 7c, the bent part 48 may be formed by bending opposing sides of the optical sheet 46 substantially perpendicular to the light source 52. Bending the opposing sides of the optical sheet 46 may increase the temperature resistance of the optical sheet 46, may serve to increase the uniformity of the display, and may increase the effectiveness of the hardened part if the hardened part is adjacent to each of multiple light sources present.

Figure 8:
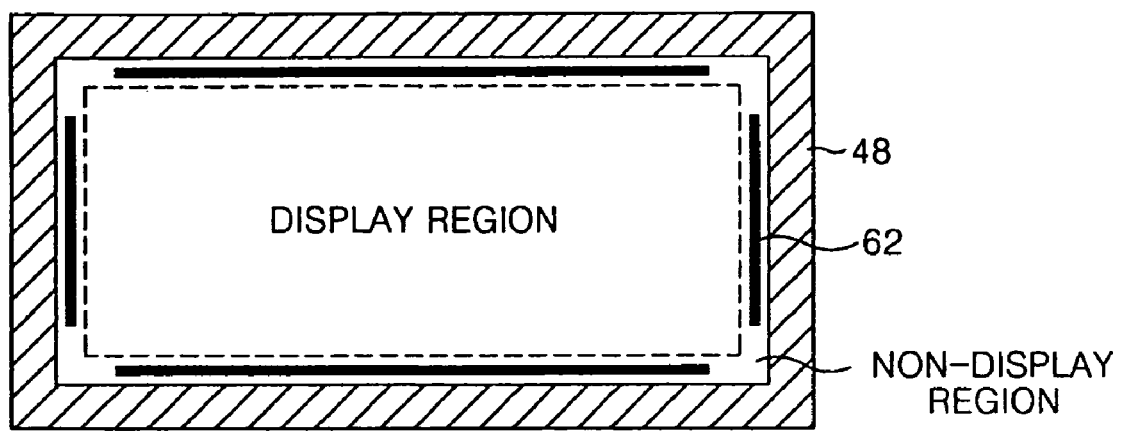
FIG. 8 is a planar view illustrating a liquid crystal display according to a third embodiment of the present invention.
Figure 9A:
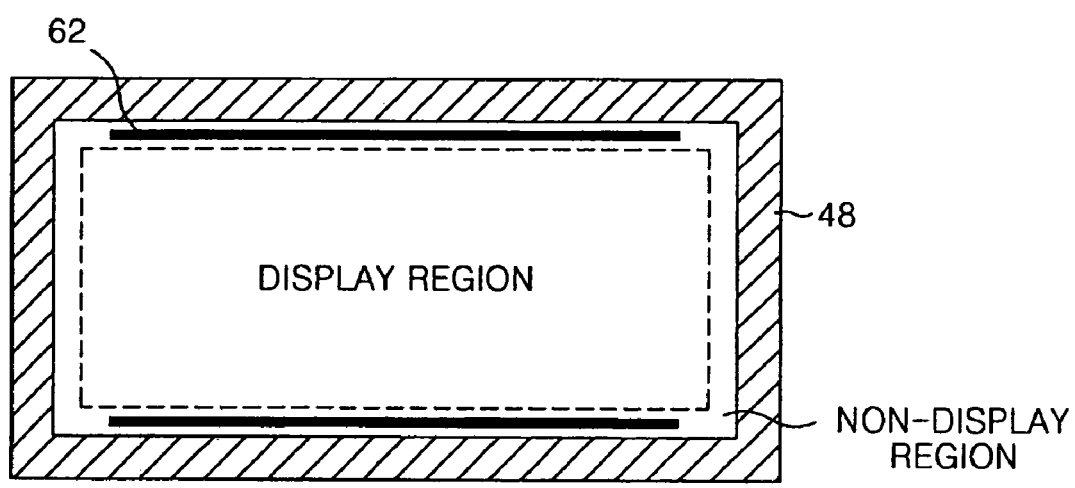
FIGS. 9a to 9h illustrate various locations of the convex part and the bent part shown in FIG. 8.
Figure 9B:
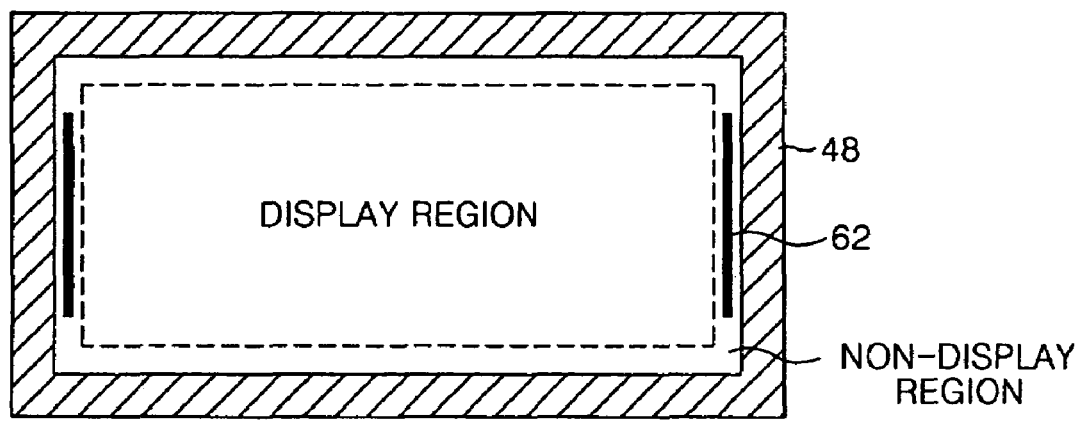
Figure 9C:
Figure 9D:
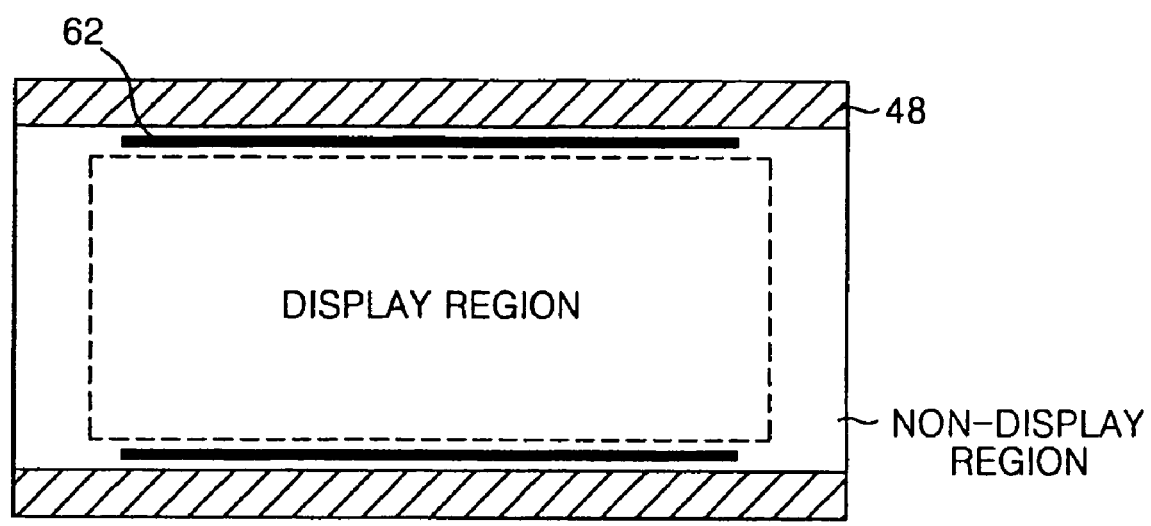
Figure 9E:
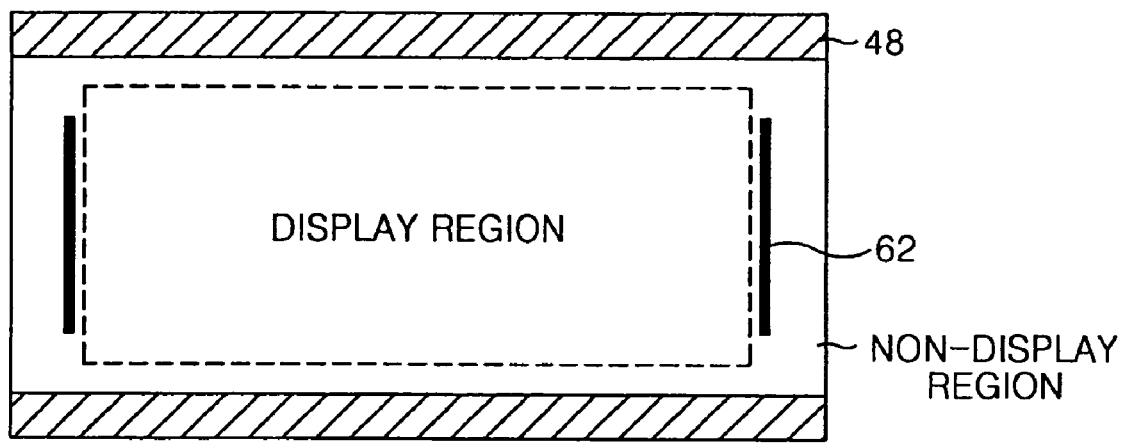
Figure 9F:
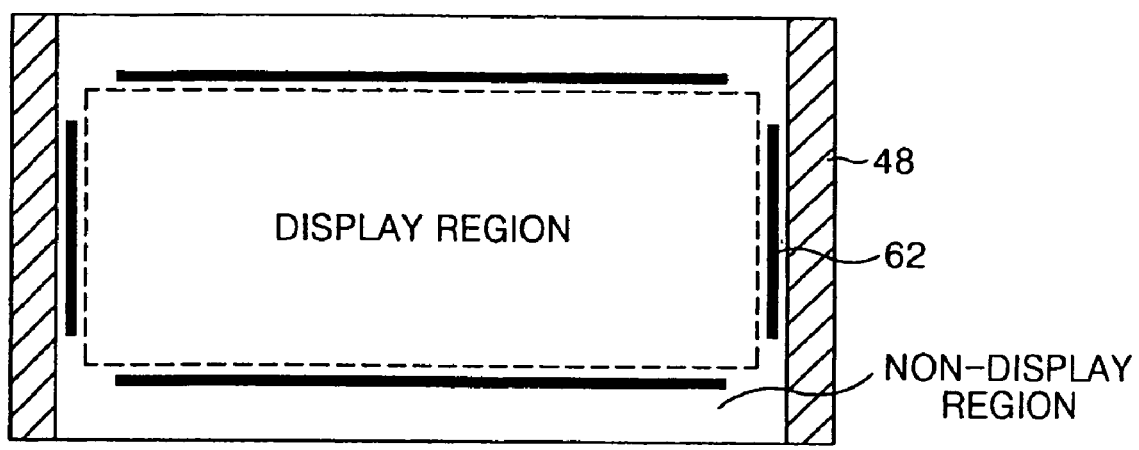
Figure 9G:
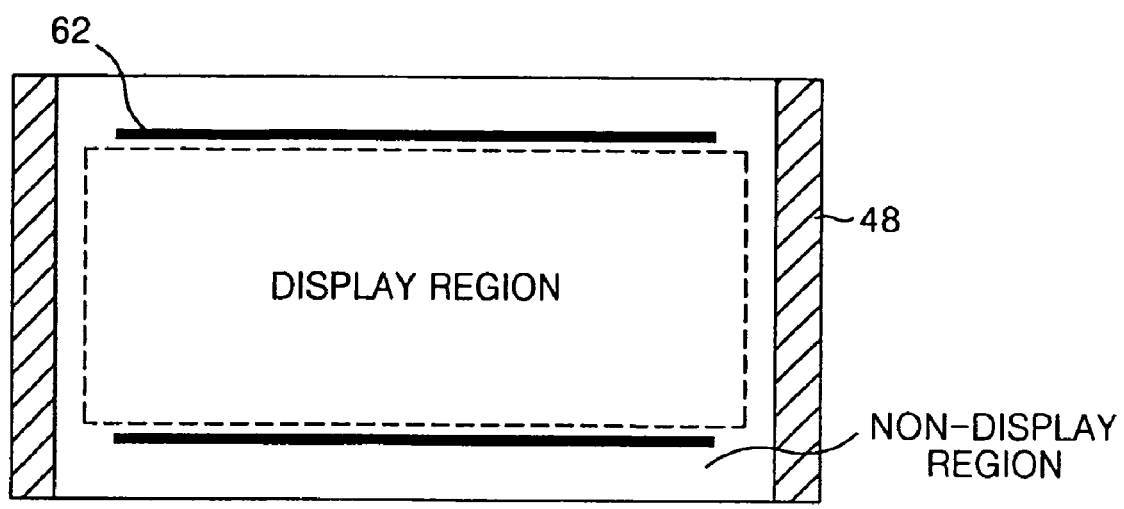
Figure 9H:
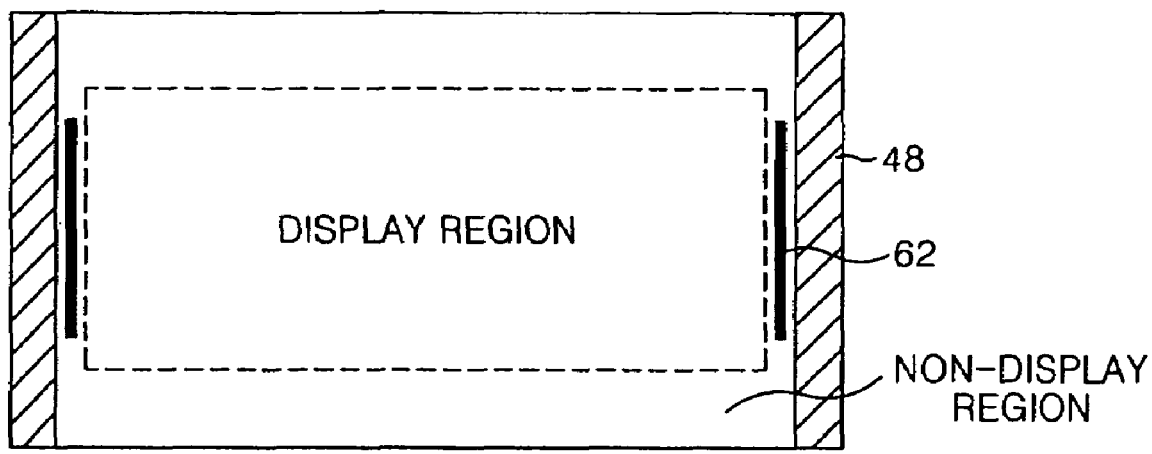

FIG. 8 illustrates the liquid crystal display according to a third embodiment of the present invention.

Referring to FIG. 8, the liquid crystal display according to the third embodiment of the present invention combines the same components as the liquid crystal display shown in FIGS. 3 and 5, containing both the convex part 62 of FIG. 3 and the bent part of FIG. 5.

As in the first two embodiments, the convex part 62 and the bent part 48 are formed in at least one side of the optical sheet 46 including, perhaps, the diffusion sheet 38 and the first and second prism sheet 40 and 42. The convex part 62 and the bent part 48 are formed in the same manner as that in the first two embodiments, and have the same effects.

The liquid crystal display may be formed in various combinations of the convex part and the bent part, as shown in FIGS. 9a to 9h. In all of the embodiments shown, the convex part 62 and the bent part 48 of the optical sheet 46 are both formed in the non-display region of the optical sheet 46 and overlap only the non-display region of the display panel 50 and thus do not affect the picture quality.

Figure 10:
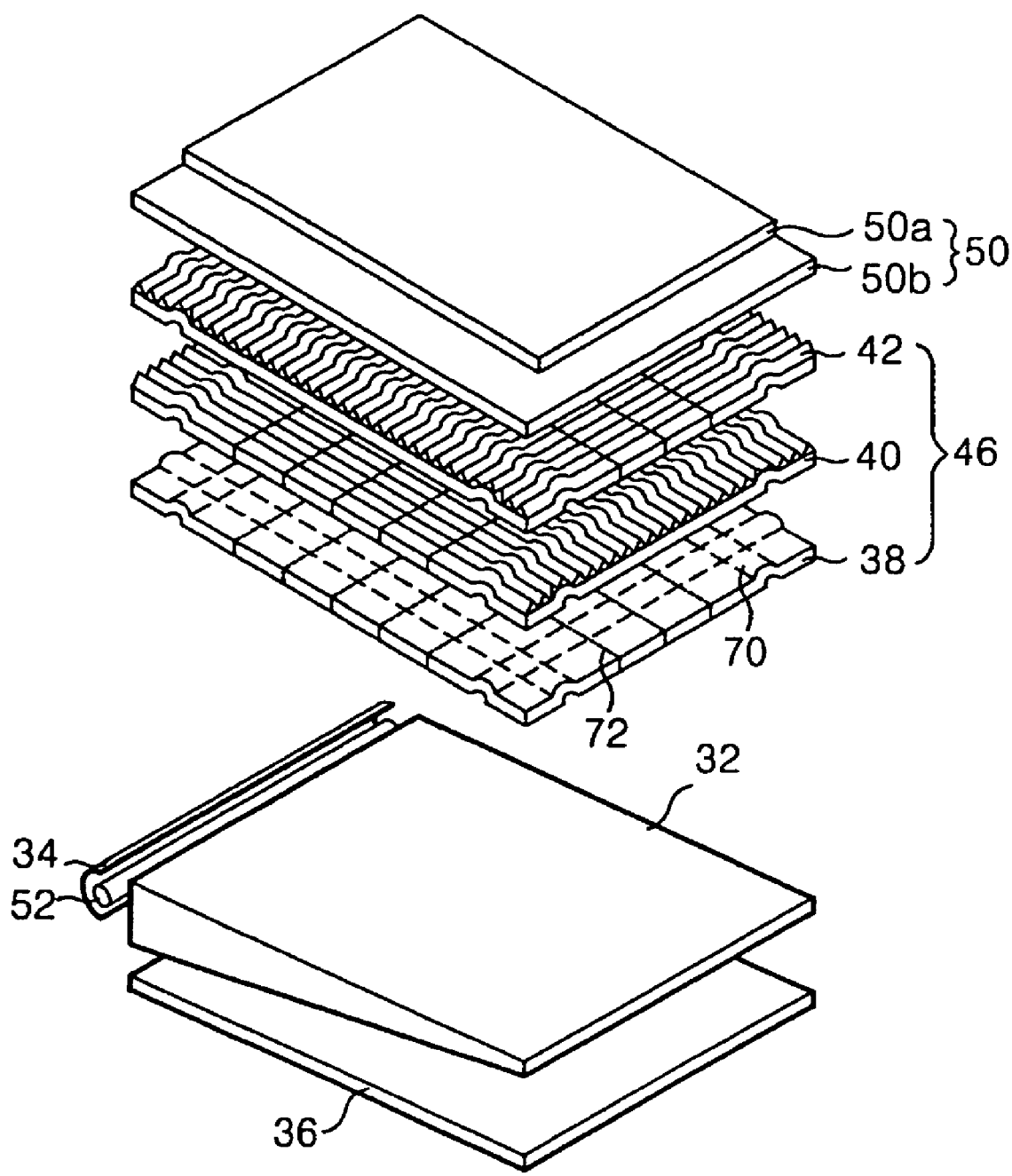
FIG. 10 is a planar views illustrating a liquid crystal display according to a fourth embodiment of the present invention.

FIG. 10 is a cross sectional view illustrating a liquid crystal display according to a fourth embodiment of the present invention.

Referring to FIG. 10, the liquid crystal display according to the fourth embodiment of the present invention comprises a hardened part 70 formed in one side of the optical sheet 46 and a cutting line 72 that is used during cutting (or other processing) of the optical sheet 46 including the hardened part 70. The optical sheet 46 is separated into hardened patterns 76.

The hardened part 70 comprises at least one of the convex part 62 shown in FIG. 4 and the bent part 48 shown in FIG. 6. The hardened part 70 is formed in a portion of the optical sheet 46 adjacent to the light source 52 in the non-display region of the optical sheet 46, which overlaps with the non-display region of the display panel 50.

Figure 11:
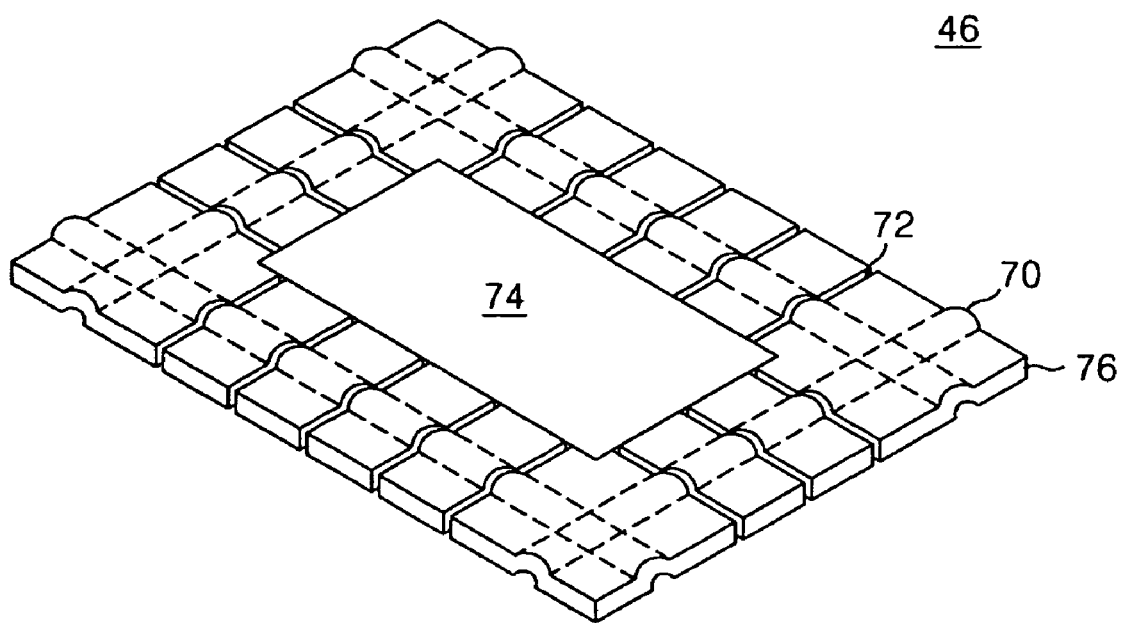
FIG. 11 is a perspective view illustrating an optical sheet shown in FIG. 10.

As shown in FIG. 11, a cut is made in a portion of the optical sheet 46 along the cutting line 72. The cutting line 72 is substantially perpendicular to the hardened part 70. The cutting line 72 minimizes the non-uniform distance between a lower polarization plate (not shown) and the optical sheet 46.

Explaining this in more detail, as shown in FIG. 14 the optical sheet 46 is formed by two layer structure comprising a base film 56 and a functional layer 58 located on the base film 56. Although more layers may exist, at least one of the existing layers is formed from a different material from that of at least one of the other layers. Since the thermal expansion of the base film 56 is different from that of the functional layer 58, warping occurs in the optical sheet 46. This warping curves the optical sheet 46 somewhat rapidly as the temperature changes during formation of the hardened part 70 if a relatively large disparity exists between the thermal expansion coefficients of the different materials.

As shown in FIG. 12, the warping causes the distance between the optical sheet 46 and the lower polarization plate 80 to be different at different locations. In fact, rather than permitting the hardened part 70 of the optical sheet 46 and the lower polarization plate 80 to contact each other, the warping causes a predetermined gap g to be maintained between the hardened part 70 of the optical sheet 46 and the lower polarization plate 80, which increases the distance between these layers. This in turn produces deterioration of the picture quality in the display region of the display panel 50 that is near the non-display region of the display panel 50.

To minimize the picture quality deterioration caused by the warping, the optical sheet 46 is cut along a plurality of cutting lines 72. These cutting lines 72 are formed substantially perpendicular to the hardened part 70 in at least one side of the optical sheet 46—the side most proximate to the light source 56. The cutting lines 72 are formed in the non-display region of the optical sheet 46 but are not formed in the display region of the optical sheet 46 that overlaps with the display region of the display panel 50.

Figure 13:
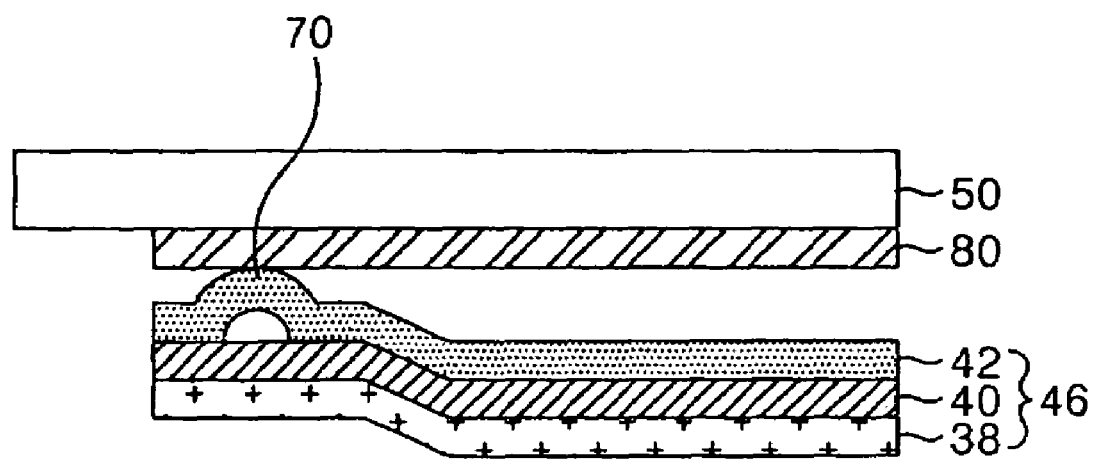
FIG. 13 is a cross sectional view illustrating a hardened part and a lower polarization plate adhered by a cutting line shown in FIG. 11.

As above, a portion of the optical sheet 46 is cut along each cutting line 72 in a direction substantially perpendicular to the hardened part 70 and separates the non-display region of the optical sheet 46 into a plurality of hardened patterns 76. As shown, the display region of the optical sheet 46 remains unaffected by this separation. The hardened patterns 76 have a relatively high degree of freedom of motion compared with the hardened part 70 integrally incorporated in the optical sheet 46 shown in FIG. 12. That is, the hardened pattern 76 has a relatively small amount of warping compared with the integrally incorporated hardened part 70 as the strain is relaxed. Accordingly, as shown in FIG. 13, the lower polarization plate 80 and the hardened part 70 can contact and may be adhered together to thereby minimize the deterioration of the picture quality by maintaining a non-uniform distance between the lower polarization plate 80 and the optical sheet 46.

As described above, a bent part and/or a convex part is formed in the non-display region of the optical sheet of the liquid crystal display according to the present invention. Upon cutting of the optical sheet, the bent part and the convex part may be formed simultaneously and hardened. Accordingly, the resistance to the stress of the optical sheet caused by the heat generated from the light source is increased, thereby lessening or preventing warping of the optical sheets. Heat from the light source is substantially prevented from being transferred to a region of the optical sheet corresponding to the display region of the display and the temperature difference across this corresponding region is minimized. The bent/convex part is formed in a direction of generation of warping and is thus resistant to warping. Further, the hardened part may be separated along a cutting line that is substantially perpendicular to the bent/convex part to form a plurality of hardened patterns. Since the hardened patterns have a relatively high degree of freedom compared with the hardened part combined with the optical sheets, this allows the lower polarization plate and the hardened part to contact and be adhered to each other. Accordingly, a uniform gap is maintained between the display area of the optical sheets and the lower polarization plate, which prevents warping of the optical sheet.

Although the present invention has been explained by the embodiments shown in the drawings described above, it should be understood to a person of ordinary skill in the art that the invention is not limited to the embodiments shown, but rather that various changes or modifications thereof are possible without departing from the spirit of the invention. Accordingly, the scope of the invention shall be determined only by the appended claims and their equivalents.

What is claimed is:

1. A display comprising:
a light source;
a display panel having a display region that provides images to an observer using light from the light source; and
at least one optical sheet through which light from the light source passes and having a hardened part,
wherein the hardened part has a longitudinal axis spaced a distance from a nearest edge of the optical sheet disposed parallel to the longitudinal axis, and comprises a projecting part, wherein a height of the projecting part is about 0.15 mm to about 0.2 mm.

2. A display comprising:
a light source;
a display panel having a display region that provides images to an observer using light from the light source; and
at least one optical sheet through which light from the light source passes and having a hardened part,
wherein the hardened part has a longitudinal axis spaced a distance from a nearest edge of the optical sheet disposed parallel to the longitudinal axis, and comprises a projecting part, wherein the hardened part is integral to the optical sheet, and the optical sheet comprises a non-display region in which the hardened part is formed, wherein a height of the projecting part is about 0.15 mm to about 0.2 mm.

3. The display according to claim 2, further comprising:
a light guide panel on which light from the light source impinges and from which light is emitted towards a display panel,
wherein the at least one optical sheet comprises a diffusion sheet.

4. The display according to claim 2, wherein display panel comprises a non-display region in which images are not displayed, and the hardened part overlaps the non-display region of the display panel.

5. The display according to claim 4, wherein the hardened part overlaps only the non-display region of the display panel.

6. The display according to claim 2, wherein the hardened part is formed on at least opposing sides of the at least one optical sheets.

7. The display according to claim 2, wherein the projecting part projects towards the display panel.

8. The display according to claim 2, wherein the hardened part is separated into hardened patterns.

9. The display according to claim 8, wherein the hardened patterns are substantially rectangular.

10. The display according to claim 8, wherein the display panel has a non-display region in which images are not displayed, and the hardened patterns overlap the non-display region of the display panel.

11. The display according to claim 10, wherein the hardened patterns overlap only the non-display region of the display panel.

12. A method of manufacturing a display, the method comprising:
obtaining a light source;
obtaining a display panel in which images are observed in a display region by an observer using the light;
obtaining an optical sheet through which light from the light source passes, the optical sheet having a hardened part, wherein the hardened part is integral to the optical sheet and has a longitudinal axis spaced a distance from a nearest edge of the optical sheet disposed parallel to the longitudinal axis; and
positioning the at least one optical sheet such that at least a portion of the hardened part is more proximate to the light source than to a center of the at least one optical sheet,
and further comprising positioning the hardened part in a non-display region of the at least one optical sheet that overlaps with a non-display region of the display panel in which images are not provided to the observer,
wherein the hardened part comprises a projecting part with a cylindrical shape, wherein a height of the projecting part is about 0.15 mm to about 0.2 mm.

13. The method according to claim 12, further comprising forming the hardened part in the at least one optical sheet.

14. The method according to claim 12, further comprising:
converting the light from the light source into a substantially planar light source and directing the converted light towards the display panel;
diffusing the converted light uniformly over a diffusion region and directing the uniformly spread light towards the display panel in a direction substantially perpendicular to the display panel.

15. The method according to claim 12, further comprising positioning the hardened part such that the hardened part only overlaps the non-display region of the display panel.

16. The method according to claim 12, further comprising positioning the at least one optical sheet such that the hardened part is disposed on at least opposing sides of the at least one optical sheet.

17. The method according to claim 12, wherein the at least one optical sheet contains the hardened part having a projecting portion that projects towards the display panel.

18. The method according to claim 17, further comprising forming the projecting portion in the at least one optical sheet.

19. The method according to claim 17, wherein the projecting portion comprises a convex part.

20. The method according to claim 12, wherein the hardened part comprises hardened patterns.

21. The method according to claim 12, further comprising cutting a portion of the at least one optical sheet along a line that includes the hardened part.

22. The method according to claim 21, further comprising cutting the hardened part substantially perpendicular to the hardened part to form the hardened patterns.

23. The method according to claim 12, further comprising separating the hardened part into hardened patterns.

24. The method according to claim 12, further comprising aligning the hardened part in at least one of a direction parallel to or perpendicular to the light source.

* * * * *